J. M. BURTON.
WATER METER.
APPLICATION FILED OCT. 26, 1910.
1,116,008.
Patented Nov. 3, 1914.
2 SHEETS—SHEET 2.
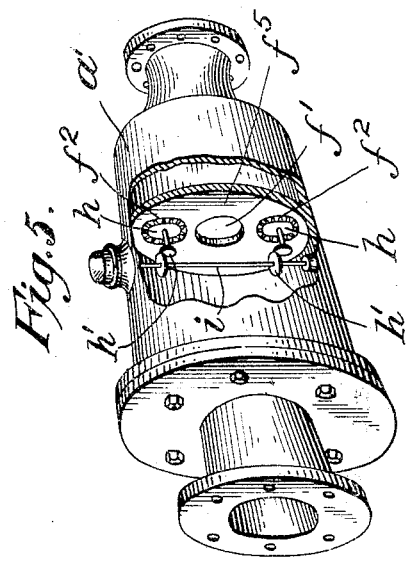
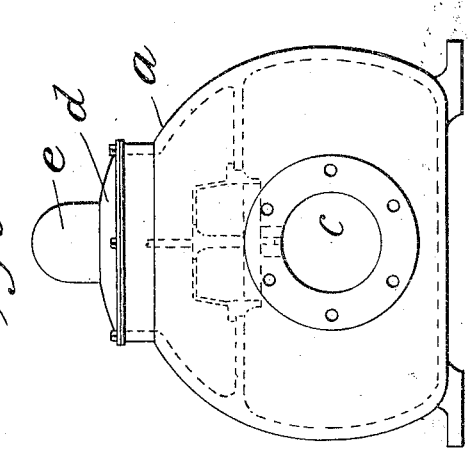
Attest:
Inventor:
James M. Burton
by Redding, Greeley & Austin
Attys.

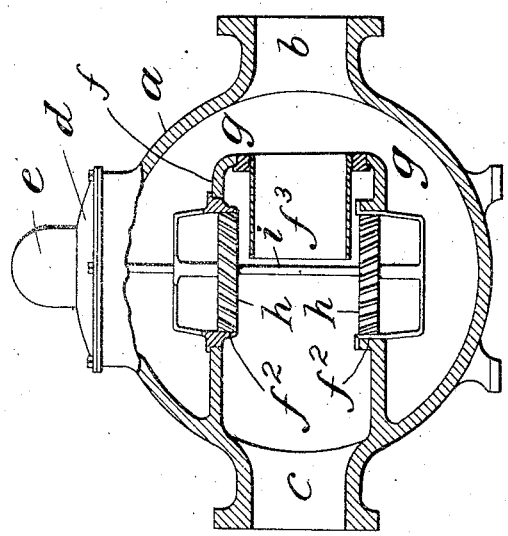
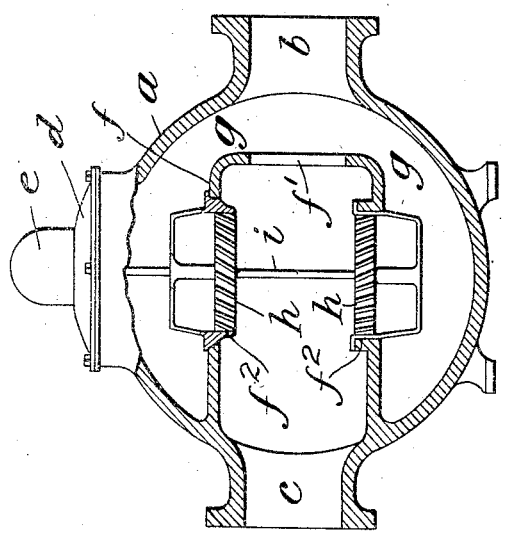

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

WATER-METER.

1,116,008.   Specification of Letters Patent.   Patented Nov. 3, 1914.

Application filed October 26, 1910. Serial No. 589,113.

*To all whom it may concern:*

Be it known that I, JAMES M. BURTON, a citizen of the United States, residing in Long Island City, in the borough of Queens of the city of New York, in the State of New York, have invented certain new and useful Improvements in Water-Meters, of which the following is a specification, reference being had to the accompanying drawings, forming a part hereof.

In the designing of water meters which are intended to register not only the ordinary flow or consumption, but extraordinary flows, as for fire purposes, it has generally been accepted as a necessary evil that there should be some loss of head, even at the time of an extraordinary flow, and many efforts have been made to reduce the loss of head as much as possible so as to meet the exacting requirements of fire underwriters. Heretofore it has been thought necessary to construct such meters, especially those of the usual proportional type, in which a proportion of the flow is diverted through a by-pass in which is placed a meter which registers the flow through such by-pass, supposed to be in proportion to the main flow, in such manner that the main flow is restricted sufficiently to cause a sufficient flow through the by-pass to operate the meter. In another type of meter, flow through the body of the meter, under ordinary service conditions, is wholly prevented by the interposition of a check valve, which opens automatically under the pressure differential established under extraordinary conditions, as when the water is used for fire purposes, the check valve being arranged to offer as little resistance as possible when open and to effect an indication of the number of times it has been opened and, in some cases, of the duration of each opening, there being no metering of the extraordinary flow by a proportional meter or otherwise. In this invention it has been discovered that it is possible to construct a proportional meter in such manner that there shall be no substantial loss of head in the meter itself, while the flow, whether ordinary or extraordinary, is accurately registered by a proportional meter, provided the minimum flow is sufficient to operate the meter with accuracy. In accordance with the invention, the meter is so constructed as to provide a direct passage through the meter of an area in cross section approximately equal to the area in cross section of the inlet and outlet, so that the frictional resistance is not substantially greater than would be the frictional resistance of an equal length of the supply pipe, while the passage, through which passes that portion of the total flow which operates the proportional meter, is of such area as to permit also a sufficient flow of water to operate the proportional meter, provided the total flow is greater than the minimum required for practical operation. The objections of fire underwriters to loss of head during extraordinary flow and to constructions which become clogged or obstructed so as to cause loss of head, are thus practically overcome, while the accuracy of the metering for all flows above the minimum necessary to operate the meter, already proved by exhaustive tests, is capable of demonstration to the satisfaction of the water vender.

The invention will be more fully explained hereinafter with reference to the accompanying drawings in which several practical embodiments thereof are represented, and in which—

Figure 1 is a view in longitudinal, vertical section of a meter constructed in accordance with the invention. Fig. 2 is a similar view showing a slight modification. Figs. 3 and 4 are views in end elevation and longitudinal, vertical section, respectively, showing another modification. Fig. 5 is a view in perspective, partly broken out, showing still another modification.

Referring first to the construction shown in Fig. 1, the meter may have a shell or casing $a$ of any usual or suitable form, provided with an inlet $b$ and an outlet $c$, and provided also with a cap $d$ which supports the usual registering mechanism, sufficiently indicated by its casing $e$. The shell or casing $a$ may be of the usual substantially spherical form, as indicated, in Figs. 1–4, or of any other suitable form which will lend itself readily to the realization of the invention.

Within the shell or casing $a$ is a wall $f$ extended from the shell or casing $a$ near its outlet end and having therein, in direct line with the inlet and the outlet, an aperture $f'$ which may have an area in cross section substantially equal to the area in cross section of the inlet and of the outlet, and is practically unobstructed. The wall $f$ is not extended to the shell or casing *a* at its inlet end, but is so arranged, as shown in the drawings, as to provide around it or between it and the shell or casing a passage *g* which offers to the inflowing water an additional path of such area as to permit a sufficient flow to operate the proportional meter. The wall *f* is also provided with one or more openings $f^2$, in which or in each of which is placed an ordinary meter turbine *h*, mounted upon a shaft *i* and connected in the usual manner with the registering mechanism at *e*. It is generally preferable to provide two turbines *h*, *h*, as shown in Fig. 1, because the construction is thereby better balanced, although one may be employed, as indicated in Figs. 3 and 4. It will now be seen that although the frictional resistance offered to direct flow through the aperture *f'* is not substantially greater than that offered by an equal length of inlet or outlet pipe, there is offered for the water, through the passage *g* and the turbine or turbines *h*, an additional path of such relatively large area that a portion of the total flow will pass through the turbine. Obviously the area of the passage *g* need not be determined exactly, provided it is great enough to permit a sufficient flow to operate the metering devices.

Should it be found that the flow through the metering devices is not great enough to operate the metering devices properly, especially when the total flow is small, it may be desirable to create a pressure differential sufficient to insure the requisite flow through the metering devices. If this is necessary, it might be accomplished by the provision of a sleeve $f^3$ in the aperture *f'*, as shown in Fig. 2, by which may be developed a frictional resistance sufficient to increase somewhat the flow through the turbine without, however, causing any appreciable loss of head in the main flow.

In the several embodiments of the invention already described, the shell or casing *a* is shown as of spherical form. In the embodiment shown in Figs. 1, and 2, the wall *f* is shown as a tubular extension carried from the outlet toward the inlet with turbines in its upper and lower sides. Again, in Figs. 3 and 4, the wall is shown as having one member extended from the outlet end toward the inlet end above the line of the main flow, and a vertical wall, in which is formed the aperture *f'*, near the inlet end. In Fig. 5, however, the shell *a'* is shown as of generally cylindrical shape with the wall $f^5$ as a transverse diaphragm therein, such wall having a central aperture *f'* and one or more apertures $f^2$ in each of which is located a turbine *h*, operatively connected by gears *h'* with the spindle *i* of the registering mechanism. Obviously the mode of operation of the structure shown in Fig. 5 is the same as that of the structures previously described and no further explanation is necessary.

Various other embodiments of the invention will suggest themselves in view of the foregoing and it is therefore to be understood that the invention is not restricted to the details of construction and arrangement shown and described herein.

I claim as my invention:

1. In a proportional meter, the combination of a meter shell having an inlet and an outlet, a wall between the inlet and the outlet having an unobstructed main flow aperture of at least the area of the minimum of that of either the inlet or the outlet whereby the flow is unrestricted, and having also a measuring aperture of substantially the same area as that of the main flow aperture, and a measuring wheel located in the measuring aperture.

2. In a proportional meter, the combination of a meter shell having an inlet and an outlet, said shell being divided into two compartments by transverse and longitudinal walls, the transverse wall having an unobstructed main flow aperture of at least the area of the minimum of that of either the inlet or the outlet whereby the flow is unrestricted, and the longitudinal wall provided with a measuring aperture of substantially the same area as that of the main flow aperture, and a measuring wheel located in the measuring aperture.

3. In a proportional meter, the combination of a meter shell having an inlet and an outlet, said shell being divided into two compartments by transverse and longitudinal walls, the transverse wall between the inlet and the outlet having an unobstructed main flow aperture in line with the inlet and the outlet and of at least the area of the minimum of that of either the inlet or the outlet whereby the flow is unrestricted, and the longitudinal wall provided with a measuring aperture of substantially the same area as the main flow aperture and disposed laterally with respect to said main flow aperture, and a measuring wheel located in the measuring aperture.

This specification signed and witnessed this 24th day of October, A. D. 1910.

JAMES M. BURTON.

Signed in the presence of—
HAROLD R. WILFORD,
HENRY KALERS.